United States Patent [19]

Kuster

[11] 3,890,559

[45] June 17, 1975

[54] CIRCUIT FOR MONITORING AND CONTROLLING MULTIPLE POWER SUPPLIES

[75] Inventor: Karl H. Kuster, Glendale Heights, Ill.

[73] Assignee: GTE Automatic Electric Laboratories Incorporated, Northlake, Ill.

[22] Filed: May 20, 1974

[21] Appl. No.: 471,262

[52] U.S. Cl. .................. 323/21; 307/64; 307/82; 323/22 T; 323/25; 323/DIG. 1
[51] Int. Cl. ............................................. G05f 1/64
[58] Field of Search ............. 307/44, 45, 51, 58, 64, 307/65, 82; 321/2, 14, 27 R; 323/17, 21, 22 T, 23, 25, 38, DIG. 1

[56] References Cited
UNITED STATES PATENTS

| | | | |
|---|---|---|---|
| 3,428,820 | 2/1969 | Lyon | 307/64 |
| 3,736,491 | 5/1973 | Kuster | 321/14 |
| 3,808,452 | 4/1974 | Hutchinson | 307/64 |

*Primary Examiner*—A. D. Pellinen

[57] ABSTRACT

A circuit for the monitoring and control of dual DC to DC regulated power supplies furnishing regulated voltage to a common load.

8 Claims, 1 Drawing Figure

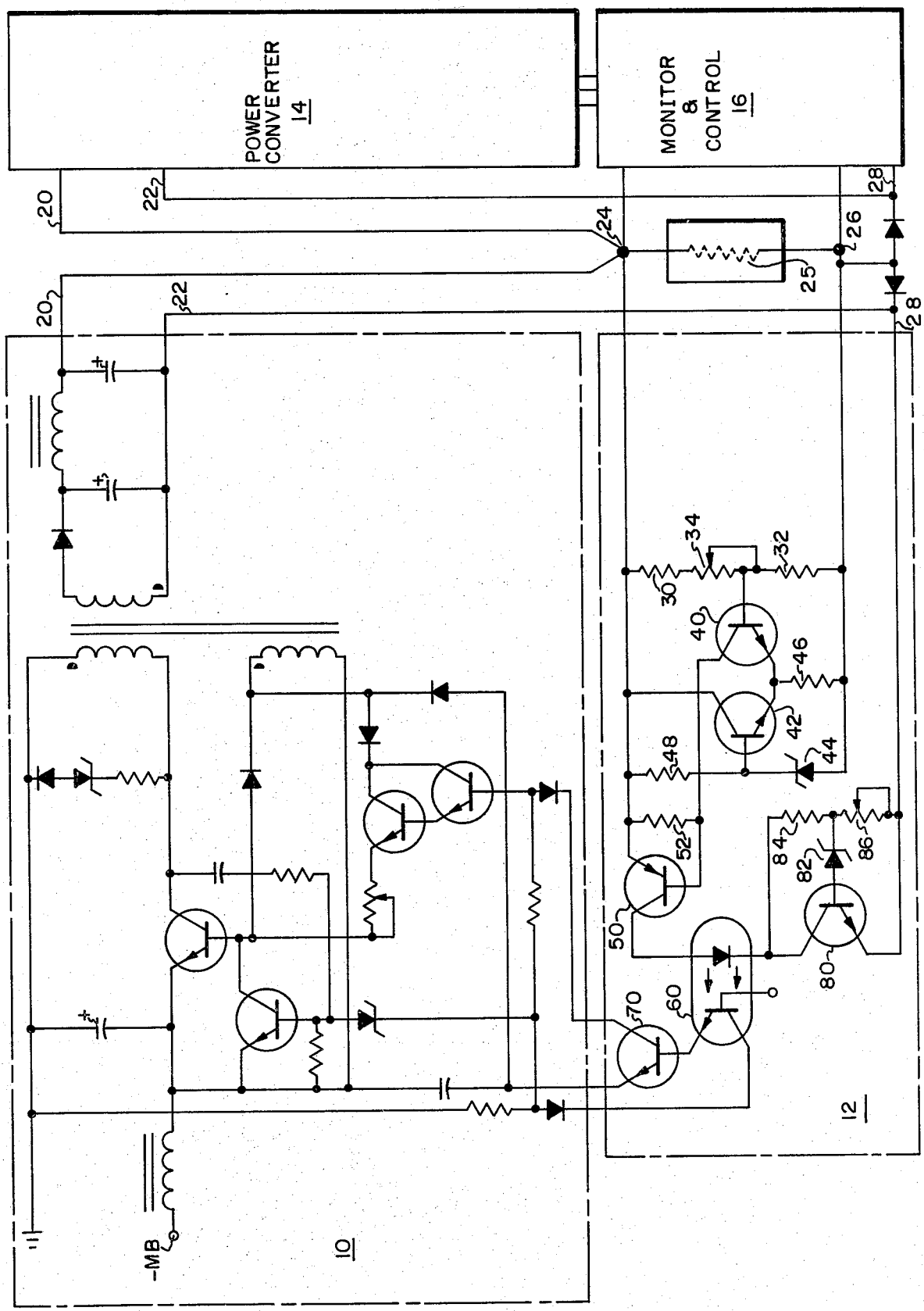

CIRCUIT FOR MONITORING AND CONTROLLING MULTIPLE POWER SUPPLIES

BACKGROUND OF THE INVENTION

1. Field of the Invention

This invention relates to power supplies and more particularly to a circuit for monitoring and control of a plurality of power supplies furnishing tightly regulated voltage to a common load.

2. Description of the Prior Art

With the continuing growth and complexity of telephone switching systems the supporting power supply systems have greatly increased in their complexity thereby creating the need for constant monitoring and control of the power supply systems.

At the present time, many systems require a tightly regulated power supply. Unable to afford the luxury of downtime to make repairs on a troubled power supply, modern telephone systems often employ two or more identical power supplies. In such a system generally each individual power supply would have the capability of assuming the full load in the event of a failure on the part of another power supply within the same system. There are various schemes available for utilizing multiple power supplies, some systems will share the load with others. Others merely act as stand-bys to replace one giving trouble.

In U.S. Pat. No. 3,424,995 to Parente issued Jan. 28, 1969, a pair of converters are arranged so that their outputs are connected in parallel to a common load. One converter functions as a spare stand-by converter with its input shorted under the control of a transfer circuit while the other main unit furnishes power to the load. Upon the failure of the main power supply, provided the failure did not occur in the output section end of the main supply, the stand-by unit is permitted to take up the load. However, it does not provide any means to monitor the stand-by converter to determine that it can fully assume the load should the need arise. When the change over does occur, a momentary drop in output will occur.

In U.S. Pat. No. 2,784,321 to Byrd issued Mar. 5, 1957, two power supplies are shown permanently connected to the load with each having the capability of taking over the whole load. However, this does not offer a tightly regulated output. However, when two tightly regulated power supplies are connected to a common load nothing effectively prohibits one power supply from assuming control and shutting down the other and creating an unbalanced situation. It is the object of this invention to provide a new and improved control system for power supplies to prevent such an occurrence and to meet the above criterion.

SUMMARY OF THE INVENTION

The present invention discloses a technique for the control of power supplies to prevent one power supply in a group of power supplies, within the system, from shutting down another power supply. In the present invention, remote sense leads are positioned very close to the load which enables them to detect any variations occurring in the line or the load. The remote sense leads also will detect if a foreign voltage source begins to supply the load; if this occurs the leads will pick up the increased voltage bringing it back to the control circuit. The signal is fed through a sensing means and a differential amplifier; the differential amplifier will compare this signal with a reference signal provided by a zener diode.

The output of the differential amplifier is extended to an inverter amplifier transistor which in turn operates an optical coupler which serves as an isolating means between the power converters used in the present system and the control circuit. The signal from the optical coupler is proportional to that which it receives from the inverter amplifier transistor; if a large signal is received the power converter output will be reduced to a lower level, if a smaller signal is received the power converter output will be increased accordingly.

The optical coupler return path is through a second reference means consisting of a transistor, a zener diode and two resistors, connected to the negative side of the power supply output to complete the circuit. However, the second reference means is controlled by a zener diode whereby if the signal from the optical coupler begins to approach the zener diode's predetermined level, the second reference means will begin to exert its influence over the signal to such a degree that when the signal from the optical coupler precisely matches that of the zener diode in the reference means the signal to the coupler will not be allowed to increase any more. The overall effect of the second reference means being only to allow the signal to reach a predetermined level whereby the power converter output will only be reduced to a certain predetermined level.

The individual components of the second reference means, the optical coupler, and the inverter amplifier transistor are also selected on the basis of their temperature coefficients so that they will be balanced thermally among each other and as a group with the result giving a tightly regulated voltage source at the output of the power supply.

BRIEF DESCRIPTION OF THE DRAWING

The single appended FIGURE is a combined schematic and blocked diagram of a monitoring and regulating power supply circuit in accordance with the present invention.

DESCRIPTION OF THE PREFERRED EMBODIMENT

With reference now to the FIGURE there is shown two identical power supply systems, each system composed of a power converter, and a control and monitor circuit, with the outputs of each system directly feeding a common load. In the first power supply system a schematic diagram shows the principal components of the power converter 10 and the principal components of the control and monitor circuit 12; in the second power supply system blocks represent the power converter 14 and the control and monitor circuit 16 of the second power supply system. The remote sense leads are connected at terminals 24 and 26 very close to the load to enable them to detect load and line variations.

When the voltage across the remote sense terminals 24 and 26 rises, due either to a foreign voltage source or to an unequal sharing of the load by the power converters, the sensing means comprised of fixed resistors 30 and 32 and a variable resistor 34 placed across the remote sense leads, will detect such an increase. This is passed on to a differential amplifier consisting of two transistors 40 and 42 and a resistor 46 connected from the line joining the emitter of transistors 40 and 42 to the sensing lead connected to terminal 26. The differential amplifier compares the voltage across the remote sense leads at terminals 24 and 26, to the reference voltage from zener diode 44.

An amplifying transistor 50 and resistor 52 operate in response to the signal from the differential amplifier. Transistor 50 further amplifies then inverts the signal from the differential amplifier extending it to the isolating means consisting of an optical coupler 60. With use of the optical coupler 60 no part of the monitoring control circuit is electrical contact connected to the associated power converter 10. The optical coupler 60 then operates a control transistor 70 which passes the control signal to the individual power converter 10.

However, if the voltage at the sense terminals 24 and 26 is high, due to a high foreign voltage source then the differential amplifier will drive transistor 50 into saturation. This would normally result in the complete turning off of the power converter. This is not desirable since, to an outside monitor the power converter appears to be inoperative, thus giving a false alarm. If this were to occur there would be no way of knowing whether the shutdown power converter was inoperative or merely in the above described condition and whether it was capable of assuming the full load if the present operating power converter should suddenly fail. There would also most likely be a start up time for the shutoff power converter with the result being less than full power to the load.

This problem is solved by a second reference means. Second reference means consisting of transistor 80, zener diode 82, and a voltage dividing network made up of a fixed resistor 84 and a variable resistor 86. Transistor 80 is placed in the main circuit between the optical coupler and the load with its collector connected to the optical coupler and the emitter connected to the load. The zener diode 82 is connected between the base of transistor 80 and the voltage dividing network consisting of fixed resistor 84 and variable resistor 86.

When a foreign voltage is encountered at sense terminals 24 and 26 the control circuit will begin to shut down the power converter thus lowering the level of the current and the voltage through leads 20 and 22. Since the transistor 50, the optical coupler 60 and a second reference means are connected in series, they will also detect the lowering of the current and the voltage at the sense terminals 24 and 26. As a result of the inherent nature of the zener diode and variables imposed by the voltage dividing network a second reference means takes over control of the monitor and control circuit and will not permit the current to drop below a fixed level.

The overall effect of the second reference means is to allow the operation of the monitor and control circuit to reach only a predetermined level whereby the power converter output will only be reduced to a pre-established magnitude.

To achieve regulation of voltage, the transistor 50, isolating means 60 and the second reference means described above are temperature compensated by matching their individual temperature coefficients such that the end result is to oppose change due to any temperature fluctuations that may occur.

While but a single embodiment of the present invention has been shown, it will be obvious to those skilled in the art that numerous modifications can be made, without departing from the spirit of the present invention, which shall be limited only by the scope of the claims appended hereto.

What is claimed is:

1. A voltage monitor and control system, connected between at least one power supply and a common load, said power supply including a direct connection to said load and including a control circuit connection, said monitor and control system comprising: a differential amplifier, a first voltage reference means connected to said differential amplifier; sensing means, connected between said load and said differential amplifier, operated in response to a voltage change at said load to cause said differential amplifier to generate an output signal proportional in magnitude to said voltage change; isolating means connected to said power supply control circuit connection; amplifying means connected between said isolating means and said differential amplifier; operated in response to said differential amplifier output signal, to operate said isolating means to extend a control signal to said power supply over said control circuit connection; and a second voltage reference means connected between said isolating means and said power supply operated in response to voltage changes at said power supply output to limit the operation of said isolating means beyond a predetermined level.

2. A voltage monitor and control system as claimed in claim 1, wherein: there is further included a plurality of remote sense leads connected between said load and said sensing means; and said sensing means comprise a voltage dividing network connected across said remote sense leads, said differential amplifier comprising a plurality of transistors, a first one of said transistors connected to said sensing means and a second of said transistors connected to said first reference means.

3. A voltage monitor and control system as claimed in claim 1, wherein: said amplifying means comprises a transistor connected between said differential amplifier and said isolating means.

4. A voltage monitor and control system as claimed in claim 1, wherein: said isolating means comprises an optical coupler connected between said amplifying means and said control circuit connection of said power supply.

5. A voltage monitor and control system as claimed in claim 4, wherein: said optical coupler comprises in combination a light emitting diode and a photosensitive transistor.

6. A voltage monitor and control system as claimed in claim 1, wherein: there is further included control means, connected between said isolating means and said power supply control connection, operated in response to the magnitude of operation of said isolating means.

7. A voltage monitor and control system as claimed in claim 1 wherein: said first reference means comprises a zener diode.

8. A voltage monitor and control system as claimed in claim 1 wherein: said second reference means comprises a transistor, including circuit connection to said isolating means, said power supply output, and to a zener diode, said diode further connected to a voltage dividing network.

* * * * *